United States Patent [19]

Tomek

[11] Patent Number: 5,188,191

[45] Date of Patent: Feb. 23, 1993

[54] SHOCK ISOLATION SUB FOR USE WITH DOWNHOLE EXPLOSIVE ACTUATED TOOLS

[75] Inventor: Martin L. Tomek, Houston, Tex.

[73] Assignee: Halliburton Logging Services, Inc., Houston, Tex.

[21] Appl. No.: 803,881

[22] Filed: Dec. 9, 1991

[51] Int. Cl.⁵ ............................................. E21B 17/07
[52] U.S. Cl. ..................................................... 175/321
[58] Field of Search ................ 166/242, 378; 175/228, 175/325.4, 347, 321, 322, 299

[56] References Cited

U.S. PATENT DOCUMENTS

| | | | |
|---|---|---|---|
| 4,133,516 | 1/1979 | Jürgens | 175/321 X |
| 4,139,994 | 2/1979 | Alther | 175/321 X |
| 4,186,569 | 2/1980 | Aumann | 175/321 X |
| 4,194,582 | 5/1980 | Ostertag | 175/321 |
| 4,281,726 | 8/1981 | Garrett | 175/321 |
| 4,552,230 | 11/1985 | Anderson et al. | 175/321 |
| 4,693,317 | 9/1987 | Edwards et al. | 166/378 |
| 4,779,852 | 10/1988 | Wassell | 175/321 |

Primary Examiner—Ramon S. Britts
Assistant Examiner—Frank S. Tsay
Attorney, Agent, or Firm—William J. Beard

[57] ABSTRACT

The present disclosure is directed to a shock absorbing device for threading in a tubing string for running delicate instruments into a well borehole where they are in near proximity to explosives which might otherwise be detonate. This particularly is important in a well borehole which is filled with a standing column of liquid which transmits the shock waves quite readily. This is a separate assembly which can be threaded in the tubing string and has a pin and box connection for that. Moreover, it is formed of an outer mandrel surrounding connected inner upper and inner lower mandrels; the inner mandrels define annular spaces for receiving shock absorbers defined by alternating thin layers of metal and rubber; the metal and rubber washers have different shock wave impedances and tend therefore to absorb shock waves traveling either upwardly or downwardly in the well borehole.

18 Claims, 1 Drawing Sheet

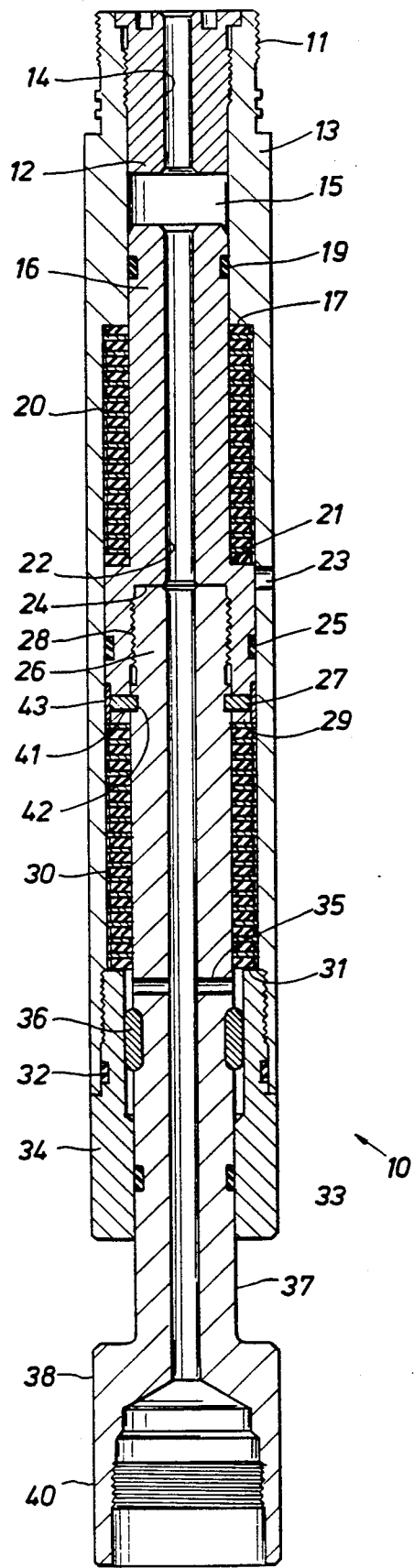

SHOCK ISOLATION SUB FOR USE WITH DOWNHOLE EXPLOSIVE ACTUATED TOOLS

BACKGROUND OF THE DISCLOSURE

At a stage where a well has been drilled but not completed, it is often necessary to use explosive devices in the well. In open hole, it is necessary to lower a sidewall coring device which supports an explosive charge which fires a type of bullet or coring device into the wall to take a sample. This requires detonation of one or more explosives to take one or more samples. Alternatively, a well will be partially completed by placing a casing in the well borehole and cementing that casing in place. Later, one or more shaped charges form radially directed perforations into the casing and into the adjacent formations. This again requires detonation of explosive devices. Explosive devices are supported on carriers which are elongate cylindrical bodies which can support one or more explosive charges. It is not uncommon to place a very large number of shaped charges on a tool and lower them into the well borehole to form the perforations.

It is necessary to properly position all types of explosive devices at the right depth in the well borehole. This can be done in part by simply positioning the explosives and supporting cylindrical tool bodies on a cable. Cables, however, stretch and the amount of stretch in 10,000 feet of cable is very substantial. It might be predictable in a well which is precisely vertical. It is, however, difficult to know exactly where a 500 foot long assembly of shaped charges might be in a highly deviated well drilled from an offshore platform. The first few thousand feet of the well might be vertical, the next portion might deviate at sixty degrees from the vertical direction and thereby locate the shaped charges on a slant. Moreover, it may be necessary to incorporate safety devices including electronically operated interlocks as well as various navigational devices. All of this equipment includes expensive electronic devices as well as various and sundry pendulums for determining the vertical direction, solenoids for operation of the equipment, sensitive switches and the like.

Ordinarily, the devices described above are operated in a well which is filled at least partially, and perhaps almost totally, with the standing column of drilling fluid. This transmits the shock wave readily up and down the well borehole. The shock wave is substantial and can have a peak value of 100,000 pounds per square inch in the area where the explosive devices are included. When the explosion occurs, a pressure shock wave is propagated uphole and downhole. These shock waves are so severe that they can damage the more sensitive electronic devices which are included in the equipment.

The shock wave is ideally isolated from the more sensitive electronic components. The present disclosure sets out a shock isolation sub which is included in the string of tools which are lowered into the well borehole. This device serves to isolate the pressure shock wave from the explosives used in the operation. This device is especially useful in providing bidirectional isolation. It incorporates two separate and spaced apart stacks of shock wave reducing elements. Each stack is ideally made in similar fashion. However, one stack isolates motion in the upward direction and the other isolates motion in the downward direction. The stacks are made of alternate components. One component can be a simple metal washer, and the adjacent component can be something of a contrasting material such as a resilient material, i.e., rubber, various and sundry plastics, and other resilient materials. It is desirable to create a stack of alternating washers where adjacent members have different specific acoustical impedances to the propagation of the shock waves. This absorbs the shock wave energy and protects the electronic or other sensitive components which are located further along the tool from the shock wave source.

The present apparatus is particularly desirable in its operation in that a pressure balance across the seal areas is provided. When the shock wave is created, the peak loading is very substantial on a per unit area; this enables absorption of the shock wave without having to overcome the force created by an imbalance in seal areas. In other words, a pressure balance is achieved across the tool. As will be described in some detail, selected areas within the tool are deployed so that a pressure balance is obtained, and the balance between the respective areas keeps the tool in a fixed neutral position during detonation of such explosives, and the shock waves from the explosives can be propagated up to and through the shock sub but a substantial portion of the shock wave energy is absorbed by duplicate stacks of alternating washers. One stack is provided for shock waves which are traveling upwardly, and a similar but oppositely deployed stack handles shock waves traveling in the opposite direction. This enables the device to provide protection against the original shock wave and also against any reflected shock waves traveling along the device.

The present apparatus is briefly summarized as a shock sub which is provided with an axial passage to enable cables to extend through the shock sub. It is constructed with two specific areas which add cumulatively and which equal a larger area; the two areas are each one half of the larger area in the ideal embodiment. By proper control of applying pressure so that there is an atmospheric pressure and a hydrostatic pressure within the tool, and by appropriate movement of seals, the larger area is equal to the sum of the two small areas so that pressure imbalance across the tool is avoided and relative movement within the tool is thereby avoided. This enables the tool to transmit shock waves (traveling upwardly or downwardly) through the respective stacks of washers so that the shock waves are absorbed. Delicate electronic equipment which is otherwise located in the well borehole is protected.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The only drawing incorporated in this disclosure is a sectional view along the length of the shock isolation sub of the present disclosure and shows a pin end at the upper portion, and also includes a box end at the lower portion to enable connection in a string of operative tools lowered in a well borehole and further showing an axial passage therethrough with two stacks of alternating washers respectively formed of hard and soft materials.

DETAILED DESCRIPTION OF THE PREFERRED EMBODIMENT

Attention is first directed to the only drawing incorporated with this disclosure and in particular to the top end where the numeral 10 identifies the shock isolation sub of the present disclosure which is constructed with a pin end 11 for easy connection with a segmented string of oil tools which thread together. This is adapted to be connected serially with such tools. Assume for purposes of description that the pin end 11 is threaded to an assembly supporting the sensitive electronics for making the device operate. This electronic package may include a gyroscope, a gravity vector determining pendulum, memory chips, solenoids, and switches for closure which determine the mode of operation of the device. All of the components at the top end are typically sensitive to shock waves and ought to be protected from the shock waves created by explosives below the tool. Below the tool 10 of the present disclosure, one or more explosive devices are typically installed. The explosive devices typically include explosive powered coring devices and also explosive powered perforating guns. When these are detonated in the standing column of liquid normally filling the well borehole, they create a tremendous shock wave which is transmitted upwardly and downwardly and which may otherwise destroy equipment. This shock isolation sub prevents that.

The shock sub 10 as mentioned has an upper end portion which is threaded at 11 for ready connection with the supporting tools which are protected by the device. There is a plug 12 at the upper end which defines a closure across the hollow tubular member 13, and an axial passage 14 through the tool is incorporated. The passage extends the full length of the tool from top to bottom to receive conductors from electronically controlled equipment, detonators and the like, and provides a signal flow path along the center of the tool which connects to the explosives therebelow.

The plug 12 closes the top end of the tool and is fastened in place. Because the plug is relatively large in diameter, it is held in position by a suitable set of threads and can even be locked in place by means of a setscrew or the like. It defines a small cylindrical chamber 15 therebelow. That chamber is immediately adjacent to and is defined at its lower end by an inner mandrel 16. The mandrel 16 is received within the outer upper mandrel 13. It is able to telescope. The mandrel 16 travels upwardly but its maximum range of travel is limited by the downwardly facing shoulder 17. Leakage between the inner mandrel and the outer mandrel is prevented by the set of seals or O-rings 19.

The numeral 20 identifies a stack of energy absorbing washers. It is a stack of alternating washers which are formed of hard and soft materials. Suitable hard materials include soft rubber like materials such as buna-N which can have a durometer on the range of twenty to eighty. The alternate washers are typically a low grade steel such as 1010 or 1020 steel. The alternating washers provide alternating impedance values as a result of alternating the stacked washers. This therefore serves as a shock wave absorbing region within the tool. The several washers which make up the stack at 20 are captured below the shoulder 17 of the outer upper mandrel, and are above the shoulder 21 of the inner mandrel 16. The inner mandrel 16 defines a telescoping member which can move upwardly to compress the several washers and thereby force shock waves propagated along the tool body to be directed into the stack 20. The inner mandrel 16 extends downwardly from the shoulder 21 and below a pressure relief port 23 located below the washers 20. An axial passage 22 through the inner mandrel 16 is fluid isolated from pressures at the exterior of the tool. Leakage of fluid in the well borehole is permitted through the port 23 and up into the stack 20. Leakage is stopped however by the seal 19 so that it does not get into the internal chamber 15 or the passageway 22. In like fashion a similar seal 25 is included below the port 23.

The numeral 24 identifies a downwardly facing internal shoulder adjacent to the passage 22. This shoulder abuts the upper end of a lower inner mandrel 26 conforming to the downwardly facing shoulder 24. This mandrel is likewise hollow to extend the passage 22 through the full length of the shock isolation sub 10. The upper inner mandrel 16 is joined to the lower inner mandrel 26 by a set of threads 28. In addition to that, a set of segmented keys 27 is inserted through a window 41 in the upper mandrel 16 and into an external groove 42 in the lower mandrel 26. These keys are then covered by an encircling retaining sleeve 43 to hold them in the groove 42. This key and sleeve arrangement prevents the threaded connection from coming unscrewed. The threads are approximately even with the seal ring 25 which assures joinder of the two cooperating inner mandrels for telescoping movement without leakage on the interior except where permitted in the vicinity of the stack of washers at 20.

The outer mandrel 13 is of substantial length and spans the upper inner mandrel 16 and most of the lower inner mandrel 26. It extends about and therefore encompasses or encloses the lower inner mandrel 26. The upper inner mandrel 16 terminates at a cooperating shoulder 29 which is incorporated for contact against a stack of washers indicated generally at 30. The washers 30 serve the same purpose as the washers 20 above. The washers 30 enable the stack of washers to coact between the downwardly facing shoulder 29 just mentioned and the upwardly facing shoulder 31 which will be described. The stack is formed of the same type of washer as used in the stack 20. The stack is below the seal 25 which prevents leakage of external fluids downwardly from above the stack 30. The stack 30 is above the seal 32 which is located at the lower termination end of the outer mandrel 13. The outer mandrel 13 incorporates a threaded connection with a drive sub 34 which incorporates the upwardly facing shoulder 31. It is threaded in place and leakage is prevented by the seal ring at 32. A similar seal 33 is incorporated at the contacting external surface of the lower inner mandrel 26.

A set of keys 36 is included between the drive sub 34 and the lower inner mandrel 26. These keys prevent rotation of these components. They are received in appropriate matching slots or grooves. This enables the components to be joined together for telescoping movement but it does not permit rotational movement of the drive sub 34 with respect to the mandrel on the interior of it. There is a passage 35 which communicates the lengthwise passage 22 to the area of the keys 36 which lock against rotation. This provides pressure relief for compression of the region around the keys 36. That is, there is some movement as a result of compression of the stack 30 and that slightly forces the ambient air out of that chamber into the passage 22. As mentioned, the threaded connection with the appropriate seal ring 32 isolates this region to the exterior and also isolates it to the stack 30. The stack 30 is protected against leakage of external fluid by the seal 25 thereabove. The inner lower mandrel 26 is exposed to the exterior at the region 37 which terminates at an enlargement 38. The enlargement supports an internally threaded box end 40 which enables easy and ready connection to equipment which is located lower than the shock isolation sub in the assembled tools.

What is claimed is:

1. A shock absorber for use serially with an oil tool assembly to protect the oil tool against shock waves in the well borehole comprising:
   (a) an elongate outer mandrel;
   (b) an elongate inner mandrel moveably positioned in the upper end of said outer mandrel and having a first cross sectional area;
   (c) an elongate inner mandrel moveably positioned in the lower end of said outer mandrel and having a second cross sectional area;
   (d) separate upper and lower shock absorbing means formed of means for absorbing shock waves, said shock absorbing means being deployed between said upper and lower inner mandrels and said outer mandrel to enable shock waves to be absorbed during propagation along the well borehole, and said shock absorbing means has a third cross sectional area, said third cross sectional area equaling the sum of said first and second cross sectional areas to enable maintenance of a pressure balance across said shock absorber.

2. The apparatus of claim 1 wherein said elongate outer mandrel incorporates an inwardly directed, downwardly facing shoulder for receiving said upper shock absorbing means against said shoulder encircling around said upper inner mandrel, and said upper inner mandrel is moveably positioned relative to said shoulder, and further includes a lower shoulder on said upper inner mandrel abutting the lower end of said upper shock absorbing means.

3. The apparatus of claim 1 wherein said elongate outer mandrel incorporates an inwardly directed, downwardly facing shoulder for receiving said lower shock absorbing means against said shoulder encircling around said lower inner mandrel, and said lower inner mandrel is moveably positioned relative to said shoulder, and further includes a lower shoulder on said lower inner mandrel abutting the lower end of said upper shock absorbing means.

4. The apparatus of claim 2 wherein said shock absorbing means includes alternate layers of material having different impedances to shock wave propagation.

5. The apparatus of claim 3 wherein said shock absorbing means includes alternate layers of material having different impedances to shock wave propagation.

6. The apparatus of claim 4 wherein said shock absorbing means is formed of alternating layers of metal and alternating layers of a resilient polymeric material.

7. The apparatus of claim 5 wherein said shock absorbing means is formed of alternating layers of metal and alternating layers of a resilient polymeric material.

8. The apparatus of claim 1 wherein said upper and lower inner mandrels are serially arranged with an axial passage therethrough to receive a communication means through said shock absorber.

9. The apparatus of claim 8 wherein said outer mandrel terminates at a pin connection at the upper end thereof, and said lower inner mandrel terminates at a box connection at the lower end thereof and said box connection extends below the lower end of said outer mandrel.

10. The apparatus of claim 1 wherein said shock absorber connects to a tubing string extending to the surface and surface pressure communicates along said upper inner mandrel to act at one end of said shock absorbing means; and passage means connected from the exterior of said shock absorber to provide hydrostatic pressure from the exterior to act on the opposite end of said shock absorbing means.

11. A shock absorber for use serially with an oil tool assembly to protect the oil tool against shock waves in the well borehole comprising:
   (a) an elongate outer mandrel;
   (b) an elongate inner mandrel moveably positioned at the upper end of said outer mandrel and having a first cross sectional area;
   (c) an elongate inner mandrel moveably positioned at the lower end of said outer mandrel and having a second cross sectional area;
   (d) separate upper and lower shock absorbing means formed of means for absorbing shock waves, said shock absorbing means being deployed between said upper and lower inner mandrels and said outer mandrel to enable shock waves to be absorbed during propagation along the well borehole, and said shock absorbing means has a third cross sectional area, said third cross sectional area equaling the sum of said first and second cross sectional areas to enable maintenance of a pressure balance across said shock absorber.

12. The apparatus of claim 11 wherein said elongate outer mandrel incorporates an inwardly directed, downwardly facing shoulder for receiving said upper shock absorbing means against said shoulder encircling around said upper inner mandrel, and said upper inner mandrel is moveably positioned relative to said shoulder, and further includes a lower shoulder on said upper inner mandrel abutting the lower end of said upper shock absorbing means.

13. The apparatus of claim 11 wherein said elongate outer mandrel incorporates an inwardly directed, downwardly facing shoulder for receiving said lower shock absorbing means against said shoulder encircling around said lower inner mandrel, and said lower inner mandrel is moveably positioned relative to said shoulder, and further includes a lower shoulder on said lower inner mandrel abutting the lower end of said upper shock absorbing means.

14. The apparatus of claim 12 wherein said shock absorbing means includes alternate layers of material having different impedances to shock wave propagation.

15. The apparatus of claim 13 wherein said shock absorbing means includes alternate layers of material having different impedances to shock wave propagation.

16. The apparatus of claim 14 wherein said shock absorbing means is formed of alternating layers of metal and alternating layers of a resilient polymeric material.

17. The apparatus of claim 15 wherein said shock absorbing means is formed of alternating layers of metal and alternating layers of a resilient polymeric material.

18. The apparatus of claim 11 wherein said shock absorber connects to a tubing string extending to the surface and surface pressure communicates along said upper inner mandrel to act at one end of said shock absorbing means; and passage means connected from the exterior of said shock absorber to provide hydrostatic pressure from the exterior to act on the opposite end of said shock absorbing means.

* * * * *